(12) United States Patent
Hasegawa et al.

(10) Patent No.: US 11,165,930 B2
(45) Date of Patent: *Nov. 2, 2021

(54) INFORMATION PROCESSING APPARATUS, COLOR CONVERSION PROFILE CREATION METHOD, AND LEARNING APPARATUS

(71) Applicant: SEIKO EPSON CORPORATION, Tokyo (JP)

(72) Inventors: Jin Hasegawa, Shiojiri (JP); Satoru Ono, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/941,851

(22) Filed: Jul. 29, 2020

(65) Prior Publication Data

US 2021/0037164 A1  Feb. 4, 2021

(30) Foreign Application Priority Data

Aug. 1, 2019 (JP) .............................. JP2019-142069

(51) Int. Cl.
*H04N 1/60* (2006.01)
*G06K 9/62* (2006.01)
*H04N 1/00* (2006.01)
*G06N 20/00* (2019.01)
*G06N 3/08* (2006.01)

(52) U.S. Cl.
CPC .......... *H04N 1/603* (2013.01); *G06K 9/6256* (2013.01); *G06N 3/084* (2013.01); *G06N 20/00* (2019.01); *H04N 1/00395* (2013.01); *H04N 1/605* (2013.01); *H04N 1/6094* (2013.01); *H04N 1/6097* (2013.01)

(58) Field of Classification Search
CPC ......... H04N 1/56–648; G06K 15/1878; G06K 15/188
See application file for complete search history.

(56) References Cited

U.S. PATENT DOCUMENTS

| 7,355,750 B2 | 4/2008 | Saito et al. |
| 2003/0214686 A1 | 11/2003 | Saito et al. |
| 2008/0043266 A1 | 2/2008 | Misumi et al. |

(Continued)

FOREIGN PATENT DOCUMENTS

| EP | 1365579 | 11/2003 |
| JP | 2008-067359 | 3/2008 |

(Continued)

*Primary Examiner* — Scott A Rogers
(74) *Attorney, Agent, or Firm* — Workman Nydegger

(57) ABSTRACT

An information processing apparatus configured to store a machine-learned model that learned, by machine learning, a relationship between a type of a printing medium, an amount of a coloring material on the printing medium per unit area, and an image including a linear image and printed on the printing medium; and estimate, based on a selection information and a imaging information, by using the machine-learned model, a limit value indicating a maximum value or a minimum value of an amount of the coloring material to be used for printing on the printing medium by the printing section per unit area; and create, by using the limit value, a color conversion profile including information regarding mapping between a coordinate value in a color space and an amount of the coloring material.

7 Claims, 10 Drawing Sheets

(56) References Cited

U.S. PATENT DOCUMENTS

| | | | | |
|---|---|---|---|---|
| 2012/0224199 A1* | 9/2012 | Fukuda | ................ | H04N 1/6097 |
| | | | | 358/1.9 |
| 2012/0243011 A1* | 9/2012 | Fukuda | .................. | G06F 15/00 |
| | | | | 358/1.9 |
| 2018/0222218 A1 | 8/2018 | Okumura | | |
| 2019/0297226 A1 | 9/2019 | Ohkubo et al. | | |

FOREIGN PATENT DOCUMENTS

| | | |
|---|---|---|
| JP | 2009-111667 | 5/2009 |
| JP | 2011-193269 | 9/2011 |
| JP | 2018-098630 | 6/2018 |
| JP | 2018-126993 A | 8/2018 |

\* cited by examiner

FIG. 2

TBL1

|  | CS1 | | | | CS2 | | |
|---|---|---|---|---|---|---|---|
|  | C | M | Y | K | L | a | b |
|  | ⋮ | ⋮ | ⋮ | ⋮ | ⋮ | ⋮ | ⋮ |
| GD1 → | $C_i$ | $M_i$ | $Y_i$ | $K_i$ | $L_i$ | $a_i$ | $b_i$ |
| GD1 → | $C_{i+1}$ | $M_{i+1}$ | $Y_{i+1}$ | $K_{i+1}$ | $L_{i+1}$ | $a_{i+1}$ | $b_{i+1}$ |
|  | ⋮ | ⋮ | ⋮ | ⋮ | ⋮ | ⋮ | ⋮ |

TBL2

|  | CS2 | | | CS1 | | | |
|---|---|---|---|---|---|---|---|
|  | L | a | b | C | M | Y | K |
|  | ⋮ | ⋮ | ⋮ | ⋮ | ⋮ | ⋮ | ⋮ |
| GD2 → | $L_j$ | $a_j$ | $b_j$ | $C_j$ | $M_j$ | $Y_j$ | $K_j$ |
| GD2 → | $L_{j+1}$ | $a_{j+1}$ | $b_{j+1}$ | $C_{j+1}$ | $M_{j+1}$ | $Y_{j+1}$ | $K_{j+1}$ |
|  | ⋮ | ⋮ | ⋮ | ⋮ | ⋮ | ⋮ | ⋮ |

TBL3

| CS1 | | | | CS3 | | | |
|---|---|---|---|---|---|---|---|
| C | M | Y | K | c | m | y | k |
| ⋮ | ⋮ | ⋮ | ⋮ | ⋮ | ⋮ | ⋮ | ⋮ |
| $C_j$ | $M_j$ | $Y_j$ | $K_j$ | $c_j$ | $m_j$ | $y_j$ | $k_j$ |
| $C_{j+1}$ | $M_{j+1}$ | $Y_{j+1}$ | $K_{j+1}$ | $c_{j+1}$ | $m_{j+1}$ | $y_{j+1}$ | $k_{j+1}$ |
| ⋮ | ⋮ | ⋮ | ⋮ | ⋮ | ⋮ | ⋮ | ⋮ |

TBL

INFORMATION PROCESSING APPARATUS, COLOR CONVERSION PROFILE CREATION METHOD, AND LEARNING APPARATUS

The present application is based on, and claims priority from JP Application Serial Number 2019-142069, filed Aug. 1, 2019, the disclosure of which is hereby incorporated by reference herein in its entirety.

BACKGROUND

1. Technical Field

The present disclosure relates to an information processing apparatus, a color conversion profile creation method, and a learning apparatus.

2. Related Art

A printing apparatus that prints an image on a printing medium such as paper or film by using a coloring material such as ink or toner is known. This type of printing apparatus generally prints coloring materials of a plurality of colors separately on a printing medium to thereby print an image on the printing medium. In this regard, a color conversion profile is used for converting a color value of image information into an amount of a coloring material of each color. In the creation of the color conversion profile, to improve printing quality, it is necessary to appropriately set a limit value such as an upper limit value of an amount of a coloring material to be used for printing on a printing medium per unit area.

For example, an apparatus described in JP-A-2018-126993 determines an upper limit value of a discharge amount of ink so as to avoid a certain effect. The apparatus determines the upper limit value based on imaging information obtained by capturing an image of a printing medium on which a test pattern is printed and color measurement information obtained by measuring the color of the printing medium. Here, an upper limit value of the discharge amount at which overflowing, bleeding, or aggregation of the ink does not occur is determined based on the imaging information. Further, an upper limit value of the discharge amount at which color saturation of the ink does not occur is determined based on the color measurement information. A threshold value determined in advance in sensory evaluation performed by a plurality of people is used for each determination described above.

However, the apparatus described in JP-A-2018-126993 needs to perform printing and imaging for each effect to be avoided. Therefore, in the apparatus described in JP-A-2018-126993, many man-hours are required for creating the color conversion profile.

SUMMARY

According to an aspect of the present disclosure, an information processing apparatus includes: a storage section configured to store a machine-learned model that learned, by machine learning, a relationship between a type of a printing medium, an amount of a coloring material on the printing medium per unit area, and an image including a linear image and printed on the printing medium; a receiving section configured to receive input of selection information including medium-type information regarding a type of the printing medium; an obtaining section configured to obtain imaging information obtained by capturing the image including the linear image and printed on the printing medium by a printing section that performs printing by using the coloring material; an estimating section configured to estimate, based on the selection information and the imaging information, by using the machine-learned model, a limit value indicating a maximum value or a minimum value of an amount of the coloring material to be used for printing on the printing medium by the printing section per unit area; and a creating section configured to create, by using the limit value, a color conversion profile including information regarding mapping between a coordinate value in a color space and an amount of the coloring material.

According to an aspect of the present disclosure, a color conversion profile creation method includes: preparing a machine-learned model that learned, by machine learning, a relationship between a type of a printing medium, an amount of a coloring material on the printing medium per unit area, and an image including a linear image and printed on the printing medium; receiving input of selection information including medium-type information regarding a type of the printing medium and obtaining imaging information obtained by capturing the image including the linear image and printed on the printing medium by a printing section that performs printing by using the coloring material; estimating, based on the selection information and the imaging information, by using the machine-learned model, a limit value indicating a maximum value or a minimum value of an amount of the coloring material to be used for printing on the printing medium by the printing section per unit area; and creating, by using the limit value, a color conversion profile including information regarding mapping between a coordinate value in a color space and an amount of the coloring material.

According to an aspect of the present disclosure, a non-transitory computer-readable storage medium storing a color conversion profile creation program causing a computer to implement: a receiving function of receiving input of selection information including medium-type information regarding a type of a printing medium; an obtaining function of obtaining imaging information obtained by capturing an image including a linear image and printed on the printing medium by a printing section that performs printing by using a coloring material; an estimating function of estimating, based on the selection information and the imaging information, a limit value indicating a maximum value or a minimum value of an amount of the coloring material to be used for printing on the printing medium by the printing section per unit area, by using a machine-learned model that learned, by machine learning, a relationship between a type of a printing medium, an amount of the coloring material on the printing medium per unit area, and the image including the linear image and printed on the printing medium; and a creating function of creating, by using the limit value, a color conversion profile including information regarding mapping between a coordinate value in a color space and an amount of the coloring material.

According to an aspect of the present disclosure, a learning apparatus includes: an input section configured to receive input of a data set in which are mapped selection information including medium-type information regarding a type of a printing medium, imaging information obtained by capturing an image including a linear image and printed on the printing medium by a printing section that performs printing by using a coloring material, and a limit value indicating a maximum value or a minimum value of an amount of the coloring material to be used for printing on the printing medium by the printing section per unit area; and a learning processing section configured to generate, based on the data set, a machine-learned model that learned, by machine learning, a relationship between a type of the printing medium, an amount of the coloring material on the printing medium per unit area, and the image including the linear image and printed on the printing medium.

BRIEF DESCRIPTION OF THE DRAWINGS

FIG. 2 is a diagram illustrating an example of a color conversion table included in a color conversion profile.

DESCRIPTION OF EXEMPLARY EMBODIMENTS

Figure 1:
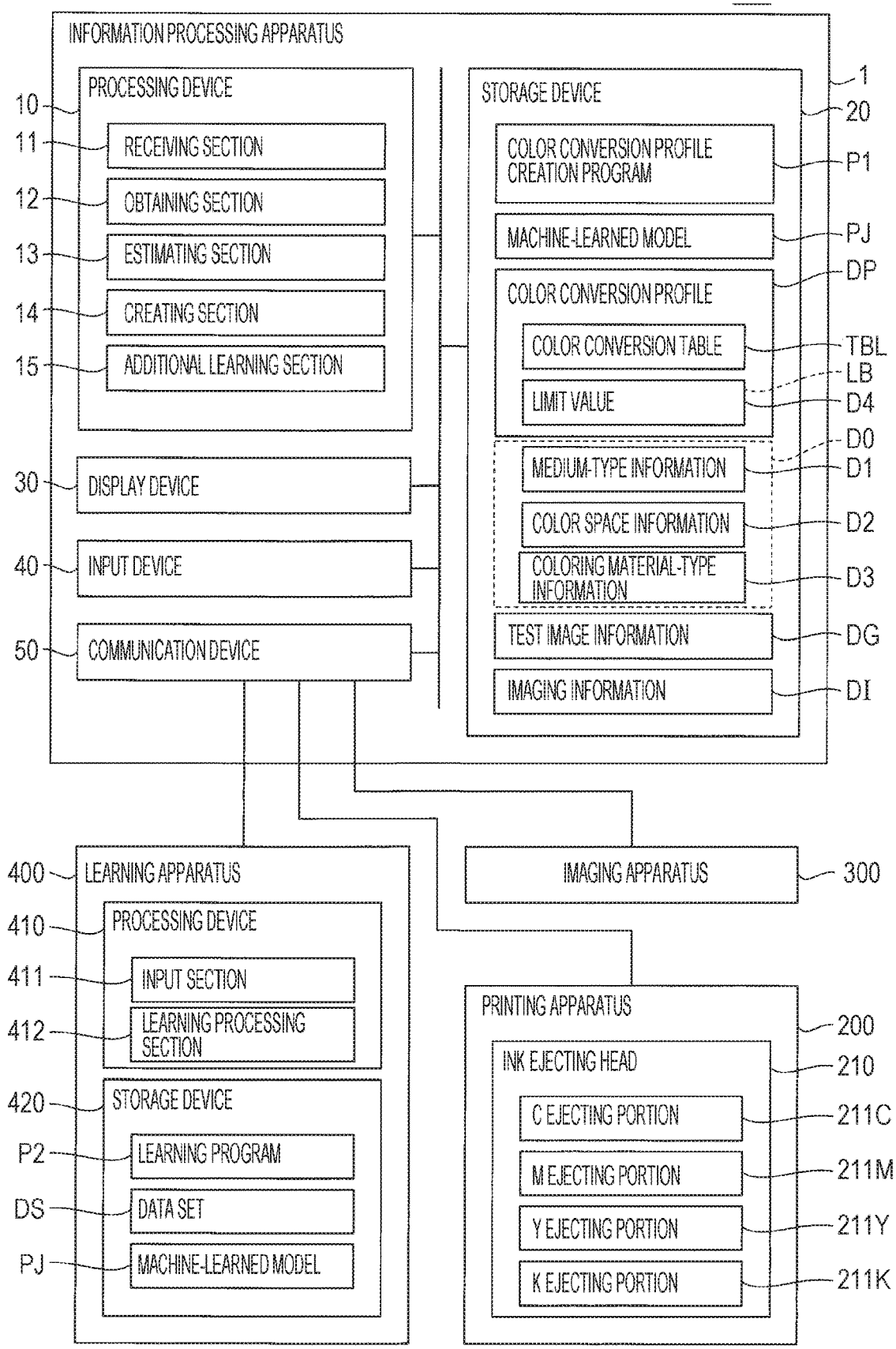
FIG. 1 is a schematic diagram illustrating an example of a configuration of a system that uses an information processing apparatus according to an embodiment.

Hereinafter, exemplary embodiments according to the present disclosure will be described with reference to the accompanying drawings. Note that the dimensions or the scale of each component may differ appropriately from actual dimensions or scales, and some portions are schematically illustrated in the drawings to facilitate understanding. Further, the scope of the present disclosure is not limited to the embodiments unless otherwise specified in the following description.

1. Overview of System 100 Using Information Processing Apparatus 1

FIG. 1 is a schematic diagram illustrating an example of a configuration of a system 100 that uses an information processing apparatus 1 according to an embodiment. The system 100 has a function of performing printing by using an ink jet-type printing apparatus 200 that uses ink as a coloring material, and a function of creating a color conversion profile DP used for color matching in the printing performed by the printing apparatus 200. The printing apparatus 200 is an example of a "printing section". The system 100 includes the printing apparatus 200, an imaging apparatus 300, a learning apparatus 400, and the information processing apparatus 1. Each of the printing apparatus 200, the imaging apparatus 300, and the learning apparatus 400 is communicably connected to the information processing apparatus 1 in a wired or wireless manner. Note that the connection may be established via a communication network such as the Internet. Further, the learning apparatus 400 does not have to be communicably connected to the information processing apparatus 1 as long as the learning apparatus 400 can transmit and receive necessary information to and from the information processing apparatus 1.

The printing apparatus 200 is an ink jet-type printer that performs printing on a printing medium according to control by the information processing apparatus 1. It is sufficient that the printing medium be a medium on which the printing apparatus 200 can perform printing. The printing medium is not particularly limited, and examples of the printing medium include various types of paper, fabrics, and films. The printing apparatus 200 illustrated in FIG. 1 includes an ink ejecting head 210 ejecting ink of four colors: cyan, magenta, yellow, and black. Further, although not illustrated, the printing apparatus 200 includes a transport mechanism for transporting the printing medium in a predetermined direction, and a moving mechanism that moves the ink ejecting head 210 back and forth along an axis orthogonal to a transport direction of the printing medium.

The ink ejecting head 210 includes a C ejecting portion 211C for ejecting cyan ink, a M ejecting portion 211M for ejecting magenta ink, a Y ejecting portion 211Y for ejecting yellow ink, and a K ejecting portion 211K for ejecting black ink. These ejecting portions each eject, onto the printing medium, ink supplied from an ink container (not illustrated) through a plurality of nozzles (not illustrated). More specifically, each ejecting portion includes a pressure chamber and a driving element (not illustrated) for a corresponding nozzle, and as pressure in the pressure chamber is changed by the driving element, ink in the pressure chamber is ejected from the nozzle. Examples of the driving element include a piezoelectric element and a heating element. In the above-described printing apparatus 200, since the reciprocating movement of the ink ejecting head 210 and the ejection of the ink are performed in parallel, an image is formed on a printing surface of the printing medium transported.

Note that the moving mechanism for moving the ink ejecting head 210 backwards and forwards may be omitted. In this case, for example, the ink ejecting head 210 may be provided over an entire region in a width direction orthogonal to the transport direction of the printing medium. Further, the number of colors of ink ejected from the ink ejecting head 210 is not limited to four and may be three or less, or five or more.

The imaging apparatus 300 is an apparatus, such as a camera or a scanner, for capturing an image of a printing surface of a printing medium after printing performed by the printing apparatus 200. Imaging information indicating a captured image of the printing surface is generated by the imaging. When an image including a linear image based on test image information DG is printed on the printing surface, the imaging information is imaging information DI. The imaging apparatus 300 includes, for example, an imaging optical system and an imaging element. The imaging optical system is an optical system including at least one image capturing lens, and may include various types of optical elements such as a prism, or may include a zoom lens, a focusing lens, or the like. Examples of the imaging element include a charge-coupled device (CCD) image sensor and a complementary metal oxide semiconductor (CMOS) image sensor.

Note that the imaging apparatus 300 may have a spectroscopic function. In this case, for example, a diffraction grid or a wavelength-tunable filter may be provided in the imaging optical system. The image captured by the imaging apparatus 300 may be a full-color image or a monochrome image. When the captured image is a full-color image, the imaging information DI is represented by, for example, tristimulus values in an XYZ color system for each pixel of the captured image. When the captured image is a monochrome image, the imaging information DI is represented by, for example, a brightness value for each pixel of the captured image. However, the captured image is preferably a full-color image.

The information processing apparatus 1 is a computer that controls operations of the printing apparatus 200 and the imaging apparatus 300. The information processing apparatus 1 has a profile creation function of creating a color conversion profile DP by using a machine-learned model PJ provided from the learning apparatus 400, and a printing execution function of executing printing performed by the printing apparatus 200 by using the color conversion profile DP. In the present embodiment, the information processing apparatus 1 has, in addition to the above-described functions, a function of performing additional machine learning of the machine-learned model PJ based on a result of evaluation by a user. These functions are implemented by executing a color conversion profile creation program P1.

The color conversion profile DP includes a color conversion table TBL and a limit value D4. The color conversion table TBL includes information regarding mapping between a coordinate value in a color space, and an amount of ink. The color space is, for example, a device-dependent color space such as an RGB color space or a CMYK color space. The amount of ink is a supplied amount of ink of each of a plurality of colors used by the printing apparatus 200 per unit area of the printing surface of the printing medium. The limit value D4 is an upper limit value or a lower limit value of the amount of ink of a single color, a secondary color, or a higher-order color in the color conversion table TBL. That is, the limit value D4 represents a maximum value or a minimum value of the amount of ink to be used for printing on the printing medium by the printing apparatus 200 per unit area. The limit value D4 is estimated based on selection information D0 by using the machine-learned model PJ so that printing quality satisfies a predetermined condition. Note that the format of the color conversion profile DP is not particularly limited, and, for example, may conform to International Color Consortium (ICC) standards.

The machine-learned model PJ is an estimation model that learned, by machine learning, a relationship between a type of the printing medium, an amount of the coloring material on the printing medium per unit area, and an image including a linear image and printed on the printing medium. The selection information D0 includes at least medium-type information D1 among the medium-type information D1, color space information D2, and coloring material-type information D3. The medium-type information D1 is information regarding the type of the printing medium. Examples of the type of the printing medium can include plain paper, vinyl chloride sheets, and tarpaulins. The color space information D2 is information regarding the type of the color space that is a color matching standard. Examples of the color matching standard can include Japan Color, Specification for Web Offset Publication (SWOP), Euro Standard, and other standard color values. The coloring material-type information D3 is information regarding the type of the coloring material used by the printing apparatus 200. Examples of the type of the coloring material can include a serial number of ink or an ink set. In other words, the coloring material-type information D3 is information regarding the type of the printing apparatus 200. Note that "Japan Color" is a registered trademark. Further, the medium-type information D1 may be information regarding a model number of the printing medium.

The learning apparatus 400 is a computer that generates the machine-learned model PJ. The learning apparatus 400 generates the machine-learned model PJ through supervised machine learning using a data set DS as training data. Although not illustrated in FIG. 1, the data set DS includes the selection information D0, the imaging information DI, and a limit value D4a. The limit value D4a is a label corresponding to a correct value. The generation of the machine-learned model PJ in the learning apparatus 400 may simply be performed at appropriate times and may be performed based on a user instruction or may be automatically performed on a regular basis. The machine-learned model PJ generated by the learning apparatus 400 is provided to the information processing apparatus 1 according to an instruction from the information processing apparatus 1 or the like. Note that the function of the learning apparatus 400 may be implemented by the information processing apparatus 1.

In the above-described system 100, the information processing apparatus 1 estimates the limit value D4 for creating the color conversion profile DP by using the machine-learned model PJ. Therefore, when determining the limit value D4 used to create the color conversion profile DP, it is not necessary to repeatedly perform printing and imaging for each effect to be avoided. As a result, it is possible to reduce man-hours required for creating the color conversion profile DP compared to the related art. Further, the machine-learned model PJ can perform machine learning in consideration of various effects evident in an image based on the imaging information DI. In particular, since the image based on the imaging information DI includes a linear image, it is easy to obtain a machine-learned model considering "thinning", "thickening", "breaking", "adjoining", or the like of the linear image. Therefore, it is possible to easily obtain the color conversion profile DP with excellent color reproducibility compared to the related art. Hereinafter, the information processing apparatus 1 and the learning apparatus 400 will be described in detail.

2. Information Processing Apparatus 1

2-1. Configuration of Information Processing Apparatus 1

The information processing apparatus 1 includes a processing device 10, a storage device 20, a display device 30, an input device 40, and a communication device 50. The processing device 10, the storage device 20, the display device 30, the input device 40, and the communication device 50 are communicably connected to one another.

The processing device 10 is a device having a function of controlling each component of the information processing apparatus 1, the printing apparatus 200, and the imaging apparatus 300 and a function of processing various data. For example, the processing device 10 includes a processor such as a central processing unit (CPU). Note that the processing device 10 may include a single processor or a plurality of processors. Further, some or all of the functions of the processing device 10 may be implemented by hardware such as a digital signal processor (DSP), an application-specific integrated circuit (ASIC), a programmable logic device (PLD), or a field-programmable gate array (FPGA).

The storage device 20 is a device for storing various programs executable by the processing device 10 and various data to be processed by the processing device 10. The storage device 20 includes, for example, a hard disk drive or a semiconductor memory. Note that part or all of the storage device 20 may be provided in a storage device external to the information processing apparatus 1, a server, or the like.

The storage device 20 of the present embodiment stores the color conversion profile creation program P1, the machine-learned model PJ, the color conversion profile DP, the test image information DG, and the imaging information DI. Here, the storage device 20 is an example of a "storage section". Note that some or all of the color conversion profile creation program P1, the machine-learned model PJ, the color conversion profile DP, the test image information DG, and the imaging information DI may be stored in a storage device external to the information processing apparatus 1, a server, or the like.

The display device 30 displays various images according to control by the processing device 10. Here, for example, the display device 30 includes various display panels such as a liquid display panel and an organic electroluminescence (EL) display panel. Note that the display device 30 may be provided external to the information processing apparatus 1.

The input device 40 is a device for receiving a user operation. For example, the input device 40 includes a touch pad, a touch panel, or a pointing device such as a mouse. Here, when the input device 40 includes the touch panel, the input device 40 may double as the display device 30. Note that the input device 40 may be provided external to the information processing apparatus 1.

The communication device 50 is a device for performing communication with the printing apparatus 200, the imaging apparatus 300, and the learning apparatus 400 in a wired or wireless manner. For example, the communication device 50 includes an interface such as a Universal Serial Bus (USB) interface or a local area network (LAN) interface.

In the information processing apparatus 1 having the above-described configuration, the processing device 10 loads the color conversion profile creation program P1 from the storage device 20 and executes the color conversion profile creation program P1. By such execution, the processing device 10 functions as a receiving section 11, an obtaining section 12, an estimating section 13, a creating section 14, and an additional learning section 15.

The receiving section 11 implements a receiving function of receiving input of the selection information D0. The obtaining section 12 implements an obtaining function of obtaining the imaging information DI from the imaging apparatus 300. The estimating section 13 implements an estimating function of estimating the limit value D4 based on the selection information D0 and the imaging information DI by using the machine-learned model PJ. The creating section 14 implements a creating function of creating the color conversion profile DP by using the limit value D4. The additional learning section 15 receives an addition of a label LB related to suitability of the limit value D4 through a user operation and implements an additional learning function of performing additional machine learning of the machine-learned model PJ by using the label LB. For example, the additional learning section 15 performs, as the additional machine learning, machine learning similar to that of a learning processing section 412 of the learning apparatus 400 to be described later. For example, the label LB adds a weight of the limit value D4 to the additional machine learning. It is sufficient that the additional learning section 15 be provided as necessary, and the additional learning section 15 may be omitted.

2-2. Color Conversion Table TBL

FIG. 2 is a diagram illustrating an example of the color conversion table TBL included in the color conversion profile DP. The color conversion table TBL illustrated in FIG. 2 includes information TBL1, TBL2, and TBL3.

The information TBL1 and TBL2 are each information regarding mapping between coordinate values of a color space CS1 and coordinate values of a color space CS2. More specifically, the information TBL1 is an A2B table for converting the coordinate values ($C_i$, $M_i$, $Y_i$, and $K_i$) of the color space CS1 into the coordinate values ($L_i$, $a_i$, and $b_i$) of the color space CS2. A variable i is a variable for identifying a grid point GD1 set in the color space CS1. The grid points GD1 are arranged at equal intervals in a direction along each axis of the color space CS2.

Meanwhile, the information TBL2 is a B2A table for converting coordinate values ($L_j$, $a_j$, and $b_j$) of the color space CS2 into the coordinate values ($C_j$, $M_j$, $Y_j$, and $K_j$) of the color space CS1. A variable j is a variable for identifying a grid point GD2 set in the color space CS2. The grid points GD2 are arranged at equal intervals in a direction along each axis of the color space.

The color space CS1 is, for example, a device-dependent color space. FIG. 2 illustrates a case in which the color space CS1 is a CMYK color space. Meanwhile, the color space CS2 is a profile connection space (PCS) and is, for example, a device-independent color space. FIG. 2 illustrates a case in which the color space CS2 is the CIELAB color space. Regarding the color space type, the color space CS1 is simply a color space that an output device can use. The color space CS1 is not limited to a CMYK color space and may be, for example, a CMY color space or a color space specific to an output device. The color space CS2 is simply a device-independent color space. The color space CS2 is not limited to the CIELAB color space and may be, for example, an XYZ color space.

The information TBL3 is information regarding mapping between the coordinate values ($C_j$, $M_j$, $Y_j$, and $K_j$) of the color space CS2 and values ($c_j$, $m_j$, $y_j$, and $k_j$) each indicating an amount of ink. For example, the information TBL3 is a lookup table for converting the coordinate values after the conversion in the information TBL2, which is the B2A table described above, into amounts of ink. The values ($c_j$, $m_j$, $y_j$, and $k_j$) each correspond to, for example, an ink color of the ink ejecting head 210 described above, and each is a gradation value indicating an amount of ink of a corresponding color to be used.

2-3. Color Conversion Profile (DP) Creation Method

Figure 3:
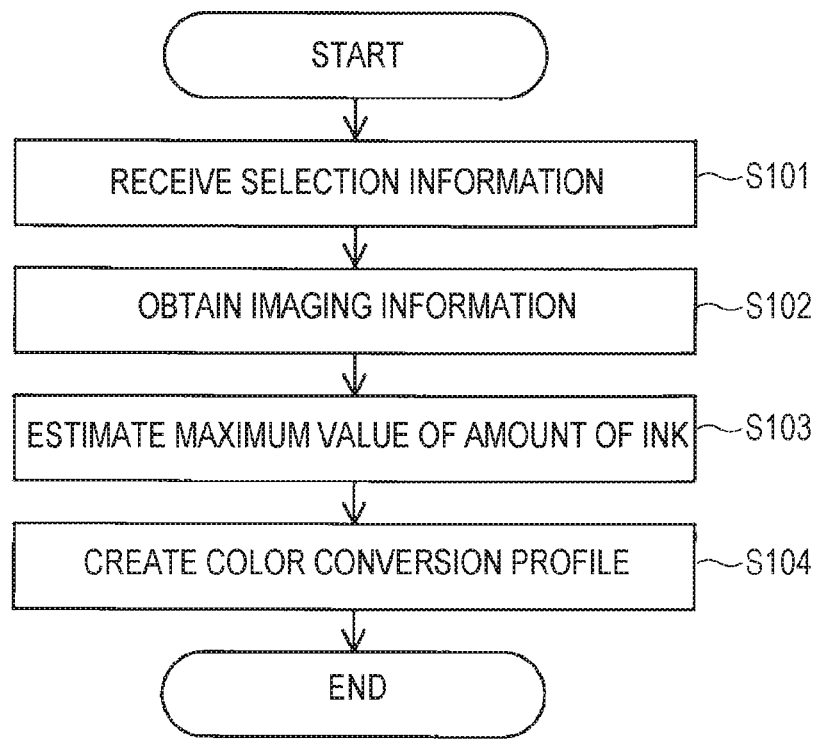
FIG. 3 is a diagram illustrating a flow of creating the color conversion profile.

FIG. 3 is a diagram illustrating a flow of creating the color conversion profile DP. As illustrated in FIG. 3, the color conversion profile (DP) creation method includes: receiving input of the selection information D0 (Step S101); obtaining the imaging information DI (Step S102); estimating the limit value D4 (Step S103); and creating the color conversion profile DP (Step S104). Hereinafter, the respective steps will be sequentially described. Note that the order of Steps S101 and S102 is not limited to that illustrated in FIG. 3. Step S101 may be performed after Step S102, or Step S101 and Step S102 may be performed at the same time.

In Step S101, input of the selection information D0 is received. Input is performed by using, for example, the input device 40. Here, for example, an image for selecting or inputting the selection information D0 is displayed on the display device 30.

In Step S102, the imaging information DI is obtained. The imaging information DI is obtained by capturing an image printed on a printing medium by the printing apparatus 200. Hereinafter, the image will be described.

Figure 4:
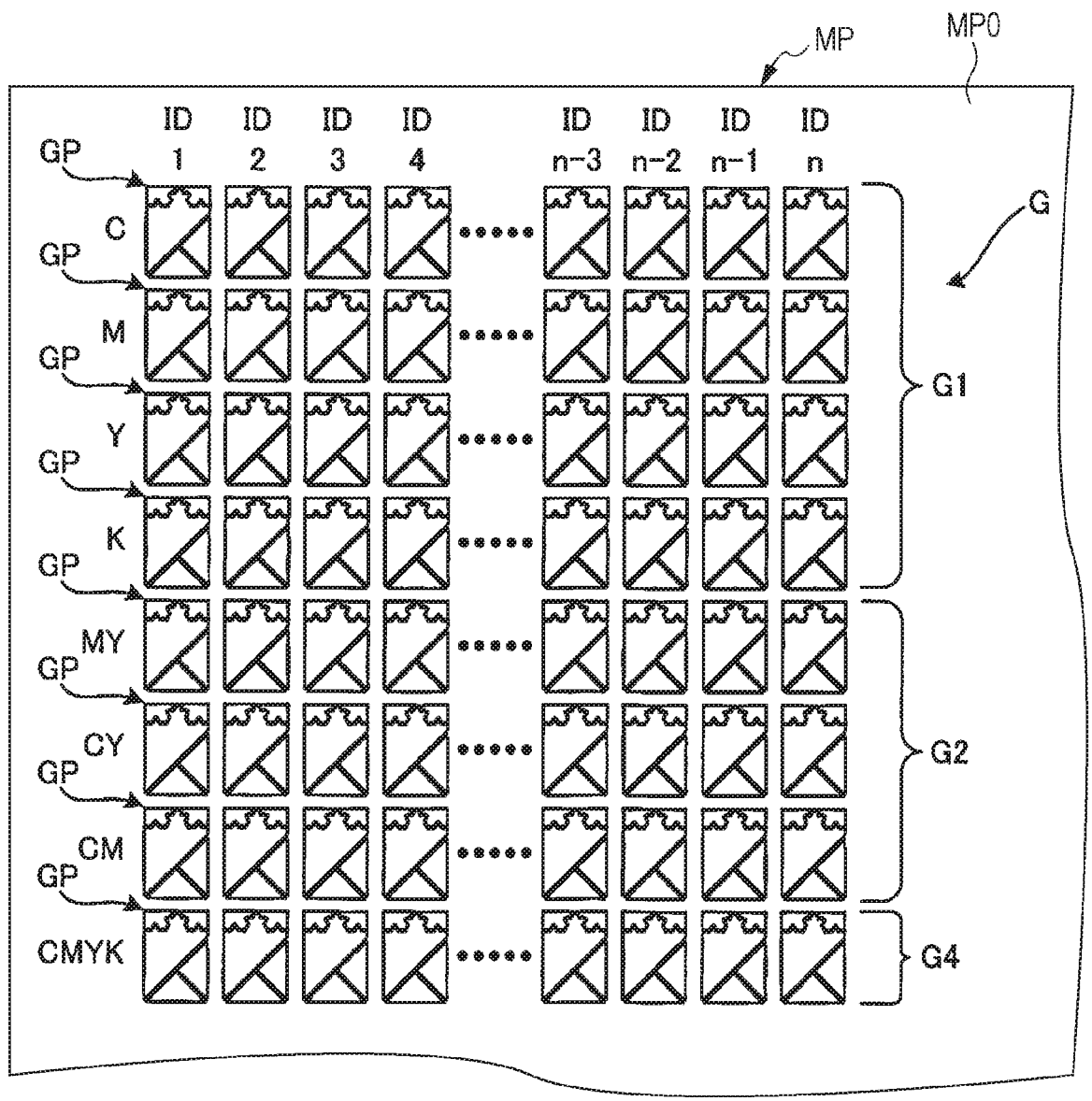
FIG. 4 is a diagram illustrating an example of an image used in creating the color conversion profile.

FIG. 4 is a diagram illustrating an image G which is an example of an image used in creating the color conversion profile DP. The image G is formed on a printing surface MP0 of a printing medium MP while appropriately varying a combination of ink of four colors used by the printing apparatus 200 described above and varying a gradation value of the ink. The image G illustrated in FIG. 4 is constituted by a plurality of unit images GP. The plurality of unit images GP are grouped into image groups G1, G2, and G4. Note that arrangement of the plurality of unit images GP is not limited to the arrangement illustrated in FIG. 4.

The image group G1 is constituted by a plurality of monochrome unit images GP formed using the ink of four colors. The image group G1 illustrated in FIG. 4 is constituted by n unit images GP of which gradation values of each color of the ink of four colors are different from each other. The image group G2 is constituted by a plurality of secondary-color unit images GP formed using the ink of four colors. The image group G2 illustrated in FIG. 4 is constituted by n unit images GP of which gradation values of each secondary color of the ink of four colors are different from each other. The image group G4 is constituted by a plurality of quaternary-color unit images GP formed using the ink of four colors. The image group G4 illustrated in FIG. 4 is constituted by n unit images GP of which gradation values of the ink are different from each other. Here, n is a natural number of 2 or more, and preferably n is 10 or more and 100 or less. Note that the range of the gradation value of the ink for forming the plurality of unit images GP is appropriately determined.

Figure 5:
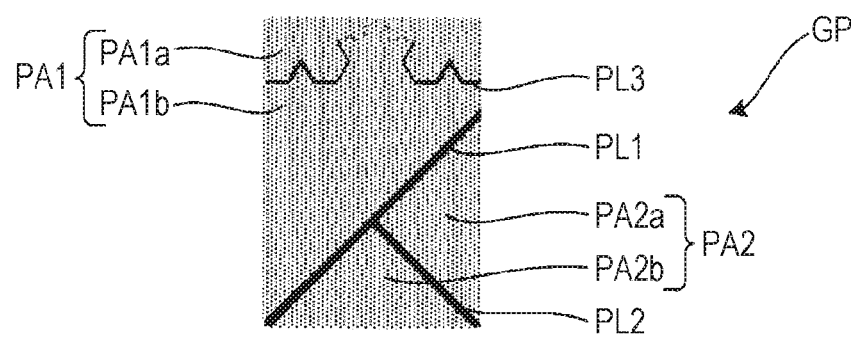
FIG. 5 is a diagram illustrating an example of a unit image constituting the image illustrated in FIG. 4.
Figure 6:
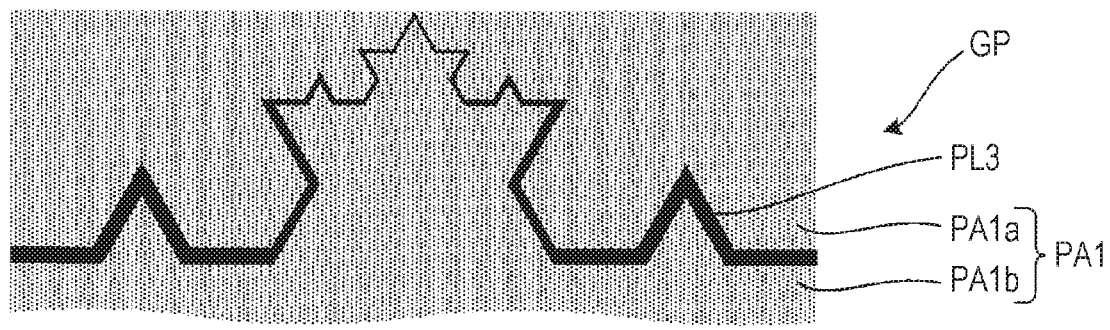
FIG. 6 is a partially enlarged diagram of the unit image illustrated in FIG. 5.

FIG. 5 is a diagram illustrating an example of a unit image GP constituting the image G illustrated in FIG. 4. FIG. 6 is a partially enlarged diagram of the unit image GP illustrated in FIG. 5. The unit image GP illustrated in FIG. 5 has a quadrilateral shape. In the example illustrated in FIG. 5, line patterns PL1, PL2, and PL3 are drawn in the unit image GP. Each of the line patterns PL1, PL2, and PL3 is an example of the "linear image". The line pattern PL1 extends from one end of one side of the unit image GP in a diagonal direction with respect to each side, and has a straight line shape and a constant width, the one side being positioned at the lower side of FIG. 5. The line pattern PL1 divides the unit image GP into a region PA1 and a region PA2. The line pattern PL2 extends from the other end of the one side in a diagonal direction with respect to each side, and has a straight line shape and a constant width. The line pattern PL2 divides the region PA2 into a region PA2*a* and a region PA2*b*. Each line pattern PL3 extends from one of two sides, connected to respective ends of the one side, to the other of the two sides while meandering. More specifically, as illustrated in FIG. 6, the line pattern PL3 is constituted by a plurality of straight line portions sequentially arranged and connected and each extending in a straight line shape. Among the plurality of straight line portions, two neighboring straight line portions form an angle. A width of the line pattern PL3 is decreased from ends of the line patterns PL3 toward the center. The line pattern PL3 divides the region PA1 into a region PA1*a* and a region PA1*b*. In the above-described unit image GP, the regions PA1 and PA2 are each printed with ink of a color corresponding to the above-described image group. The line patterns PL1, PL2, and PL3 are each printed with ink of a color different from that of the regions PA1 and PA2.

Note that the shape of each unit image GP is not limited to the shape illustrated in FIG. 5 or the like. However, it is preferable that the linear image included in each unit image GP have a portion extending in a diagonal direction with respect to a moving direction of the ink ejecting head 210. In this case, it is possible to improve an accuracy of determining the "thinning", "thickening", "breaking", or "adjoining" based on the linear image printed, in comparison to a case in which the linear image is parallel or orthogonal to the moving direction of the ink ejecting head 210.

It is possible to identify, by observing the printing surface MP0 on which the image G is printed, a relationship between the occurrence of effects such as the "thinning", "thickening", "breaking", or "adjoining" of the linear image, bleeding, aggregation, or overflowing of the ink, and the amount of ink printed on the printing surface MP0 per unit area.

Figure 7:
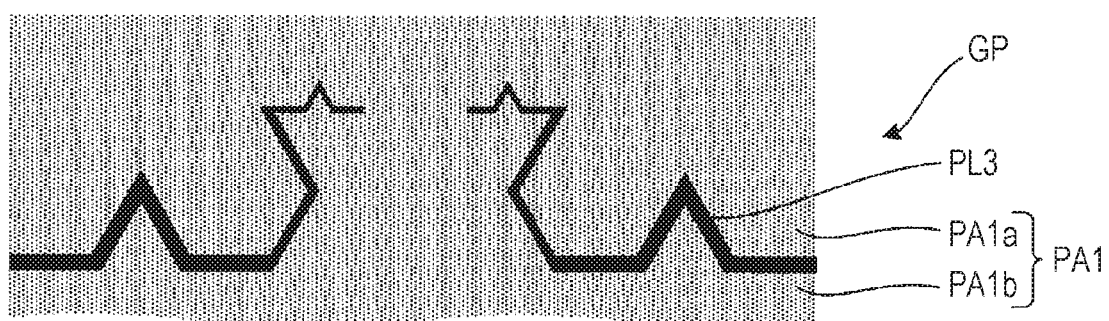
FIG. 7 is a diagram illustrating an example of a state where breaking of a linear image occurs.

FIG. 7 is a diagram illustrating an example of a state where breaking of the line pattern PL3 occurs. The "breaking of the linear image" refers to a state where a portion of the linear image in a longitudinal direction is lost due to lack of ink. FIG. 7 illustrates a state where a central portion, having the smallest width, of the line pattern PL3 is lost at the center. The "thinning of the linear image" (not illustrated) refers to a state where the linear image is not completely broken, but a width of the linear image is decreased due to lack of ink as compared with the original width of the linear image.

Figure 8:
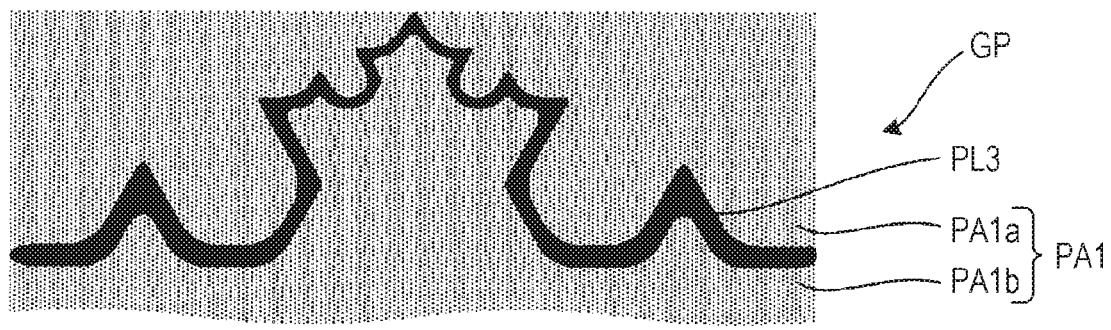
FIG. 8 is a diagram illustrating an example of a state where thickening of a linear image occurs.

FIG. 8 is a diagram illustrating an example of a state where thickening of the line pattern PL3 occurs. The "thickening of the linear image" refers to a state where a width of the linear image is increased due to an excessive amount of ink as compared with the original width of the linear image. FIG. 8 illustrates a state where widths of portions of the line pattern PL3 that should form an angle are increased as compared with the original widths thereof, and as a result, the line pattern PL3 is deformed from the original shape. The "adjoining of the linear image" (not illustrated) refers to a state where two neighboring linear images are in contact with each other due to an excessive amount of ink.

Figure 9:
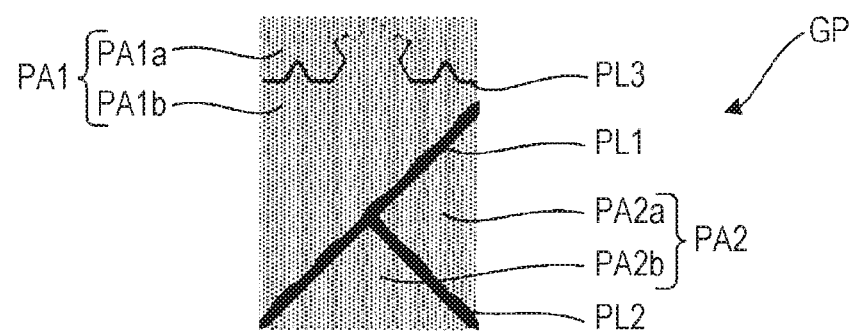
FIG. 9 is a diagram illustrating an example of a state where overflowing of ink occurs.

FIG. 9 is a diagram illustrating an example of a state where overflowing of the ink occurs. Here "overflowing of the ink" refers to a state where the ink overflows out of the original region of the unit image GP due to the supplied amount of ink being excessive relative to the ink absorbing capacity of the printing medium MP, and thus the shape of the unit image GP is lost. FIG. 9 illustrates an example in which the shape of a boundary between the regions PA1 and PA2, and the line patterns PL1 and PL2 is lost.

Figure 10:
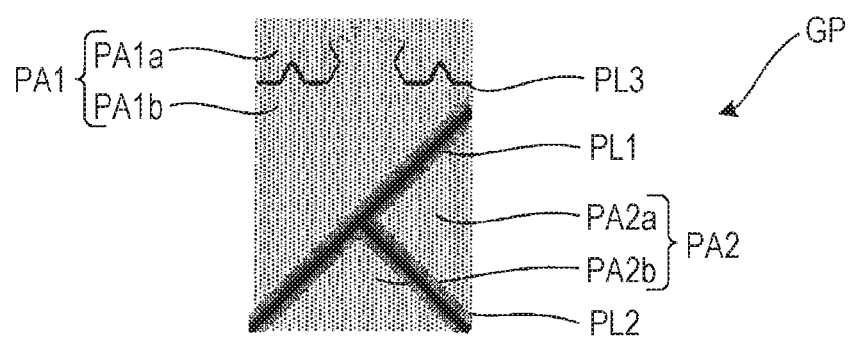
FIG. 10 is a diagram illustrating an example of a state where bleeding of ink occurs.

FIG. 10 is a diagram illustrating an example of a state where bleeding of the ink occurs. Here "bleeding of the ink" refers to a state where the ink overflows out of an original region of the unit image GP due to the supplied amount of ink being excessive relative to the ink holding capacity of the printing medium MP, and thus the distinctiveness of outlines of the unit image GP is decreased. FIG. 10 illustrates an example in which the distinctiveness of a boundary between the regions PA1 and PA2, and the line patterns PL1 and PL2 is decreased.

Figure 11:
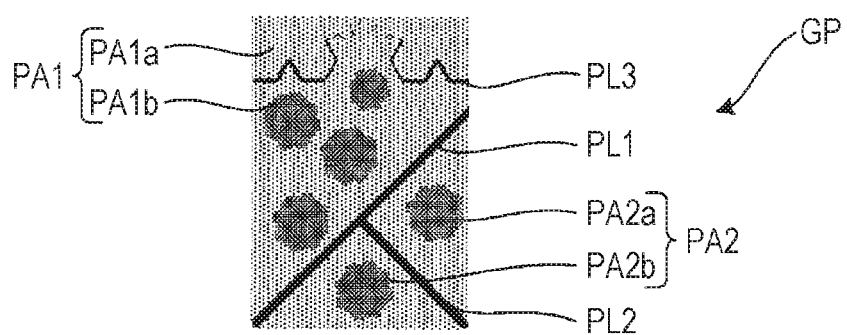
FIG. 11 is a diagram illustrating an example of a state where aggregation of ink occurs.

FIG. 11 is a diagram illustrating an example of a state where aggregation of the ink occurs. Here "aggregation of the ink" refers to a state where ink density unevenness is evident in the unit image GP due to agglomerated dispersoids when using a dispersion-type ink. FIG. 11 illustrates an example in which density unevenness is evident in each of the regions PA1 and PA2.

Although not illustrated, a tone jump in gradation or the like is evident as a color difference or density difference between unit images GP in the printed image G.

In Step S103, the estimating section 13 estimates, based on the selection information D0 and the imaging information DI, by using the machine-learned model PJ, the limit value D4 indicating a maximum value or a minimum value of the amount of ink to be used for printing on the printing medium MP by the printing apparatus 200 per unit area. The limit value D4 is represented as information ($C_i$, $M_i$, $Y_i$, and $K_i$) each indicating the amount of ink of a corresponding color.

Figure 12:
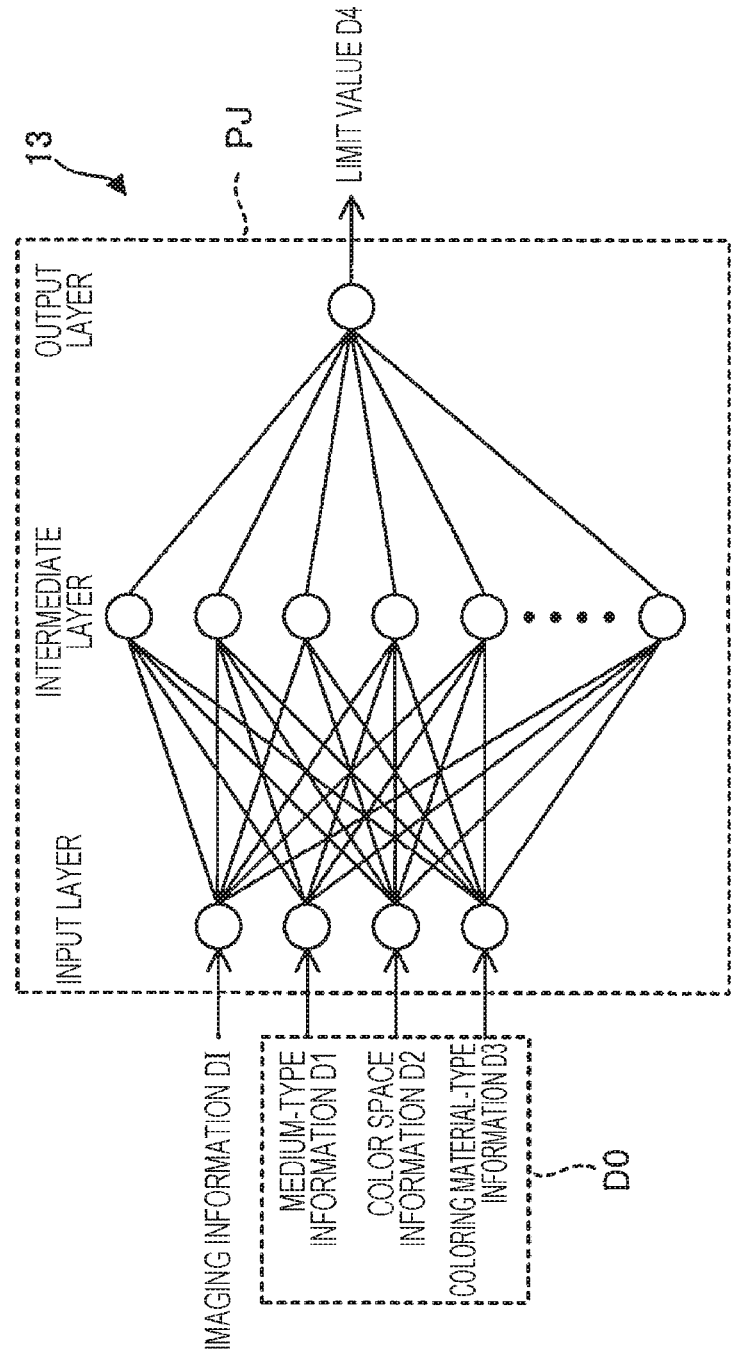
FIG. 12 is a diagram for describing an estimating section for estimating a limit value of an amount of a coloring material.

FIG. 12 is a diagram for describing the estimating section 13 for estimating the limit value D4. The machine-learned model PJ is a machine-learned model that outputs the limit value D4 in response to the input of the imaging information DI and the selection information D0.

Specifically, the machine-learned model PJ is implemented by combining a plurality of coefficients with a program causing the processing device 10 to perform a calculation for generating the limit value D4 based on the imaging information DI and the selection information D0, the plurality of coefficients being applied to the calculation. For example, the program is a program module constituting artificial intelligence software. The plurality of coefficients are set by, for example, deep learning using the data set DS in the learning apparatus 400 to be described later. As a suitable example, FIG. 12 illustrates a case in which the machine-learned model PJ is a mathematical model such as a deep neural network including an input layer, an output layer, and an intermediate layer.

Here, the machine-learned model PJ estimates, as the limit value D4, one or both of a maximum value and a minimum value of the amount of ink to be used for printing on the printing medium MP by the printing apparatus 200 per unit area. The maximum value corresponds to the largest possible value of the amount of ink at which the "thickening" or "adjoining" of the linear image described above does not occur. The minimum value corresponds to the smallest possible value of the amount of ink at which the "thinning" or "breaking" of the linear image described above does not occur. When estimating both of the maximum value and the minimum value, for example, the machine-learned model PJ may include a machine-learned model that estimates the maximum value, and a machine-learned model that estimates the minimum value, in a separate manner.

In Step S104, the creating section 14 creates the color conversion profile DP by using the limit value D4. Specifically, the creating section 14 creates the color conversion profile DP so that the amount of ink of each single color, secondary color, or quaternary color does not exceed an estimation result obtained by the estimating section 13.

In the above-described information processing apparatus 1, the estimating section 13 estimates the limit value D4 for creating the color conversion profile DP by using the machine-learned model PJ. Therefore, when determining the limit value D4 to be used to create the color conversion profile DP, it is not necessary to repeatedly perform printing and imaging for each effect to be avoided. As a result, it is possible to reduce man-hours required for creating the color conversion profile DP compared to the related art. Further, the machine-learned model PJ can perform machine learning in consideration of various effects evident in an image based on the imaging information DI. In particular, since the image based on the imaging information DI includes the linear image, it is easy to obtain a machine-learned model considering "thinning", "thickening", "breaking", "adjoining", or the like of the linear image. Therefore, it is possible to easily obtain the color conversion profile DP with excellent color reproducibility compared to the related art.

In the present embodiment, the machine-learned model PJ further learns, by machine learning, a relationship with the type of the color space used for the color conversion profile DP. Therefore, when the selection information D0 includes the color space information D2 regarding the type of the color space, it is possible to obtain the color conversion profile DP with a reduced color difference before and after the color conversion.

Here, a value of a color difference ΔE based on the mapping in the color conversion profile DP in the color space is preferably 3.0 or less, at which the color difference is hardly noticed by a person in a separately positioned comparison. In this case, it is possible to obtain a color conversion profile DP with substantially no color difference before and after the color conversion.

Further, the machine-learned model PJ further learns, by machine learning, a relationship with the type of the coloring material. Therefore, when the selection information D0 includes the coloring material-type information D3 regarding the type of the coloring material, it is possible to obtain the color conversion profile DP by considering the type of the coloring material.

In addition, the additional learning section 15 receives an addition of the label LB related to suitability of the limit value D4 through a user operation and performs additional machine learning of the machine-learned model PJ by using the label LB. Therefore, it is possible to improve color reproducibility of the color conversion profile DP afterward.

3. Learning Apparatus 400

As illustrated in FIG. 1, the learning apparatus 400 includes a processing device 410 and a storage device 420, and the processing device 410 and the storage device 420 are communicably connected to each other. Although not illustrated, the learning apparatus 400 includes a communication device that can perform communication with the information processing apparatus 1. The communication device is configured similarly to the communication device 50 of the information processing apparatus 1 described above. Note that the learning apparatus 400 may include a device similar to the display device 30 and the input device 40 of the information processing apparatus 1.

The processing device 410 is a device having a function of controlling each component of the learning apparatus 400 and a function of processing various data. For example, the processing device 410 includes a processor such as a CPU. Note that the processing device 410 may include a single processor or a plurality of processors. Further, some or all of the functions of the processing device 410 may be implemented by hardware such as a DSP, an ASIC, a PLD, and a FPGA.

The storage device 420 is a device for storing various programs executable by the processing device 410 and various data to be processed by the processing device 410. The storage device 420 includes, for example, a hard disk drive or a semiconductor memory. Note that part or all of the storage device 420 may be provided in a storage device external to the learning apparatus 400, a server, or the like.

The storage device 420 of the present embodiment stores a learning program P2, the data set DS, and the machine-learned model PJ. Note that some or all of the learning program P2, the data set DS, and the machine-learned model PJ may be stored in a storage device external to the learning apparatus 400, a server, or the like.

In the learning apparatus 400 having the above-described configuration, the processing device 410 loads the learning program P2 from the storage device 420 and executes the learning program P2. During execution, the processing device 410 functions as an input section 411 and the learning processing section 412.

The input section 411 implements a function of receiving input of the data set DS in which the selection information D0, the imaging information DI, and the limit value D4a are mapped to one another. The learning processing section 412 implements a function of generating the machine-learned model PJ based on the data set DS.

Figure 13:
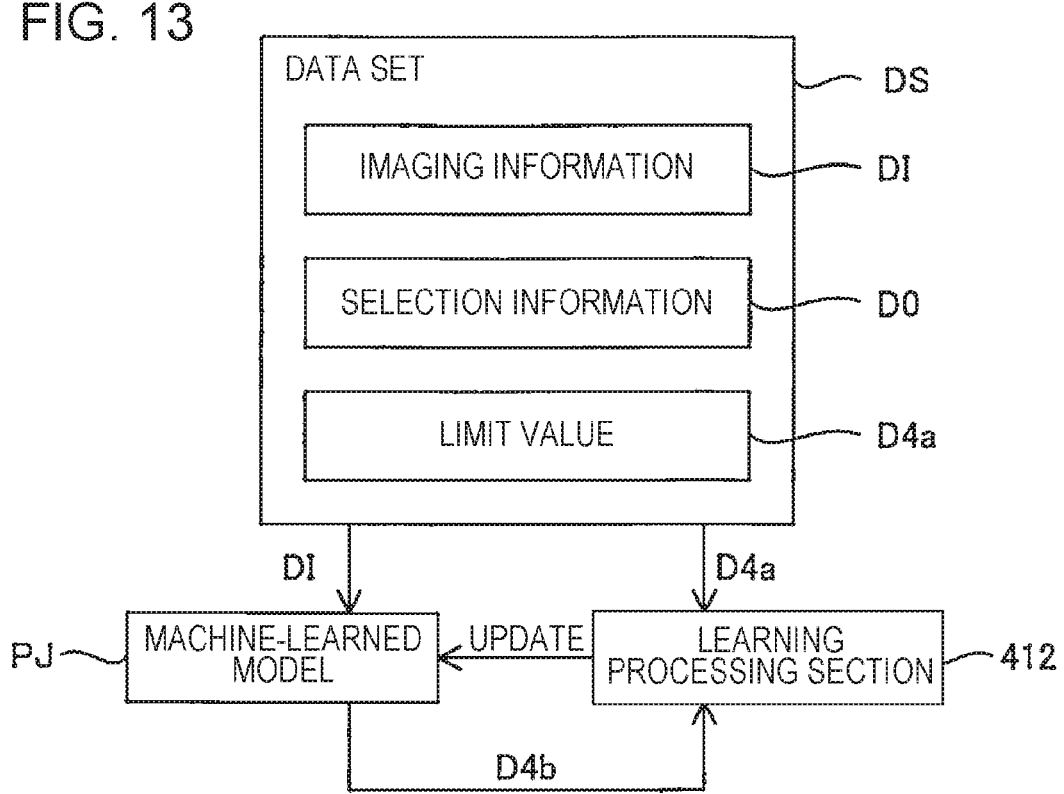
FIG. 13 is a diagram for describing machine learning for generating a machine-learned model.

FIG. 13 is a diagram for describing machine learning for generating the machine-learned model PJ. A plurality of data sets DS are used for the machine learning of the machine-learned model PJ. Each data set DS includes the imaging information DI and includes the selection information D0 and the limit value D4a corresponding to the imaging information DI. The selection information D0 and the imaging information DI in the data set DS may be generated by using an apparatus separate from the information processing apparatus 1. The limit value D4a in the data set DS is a label corresponding to a correct value for the imaging information DI and the selection information D0 in the data set DS. The label is determined by a manager or the like based on a state of the image G described above. Here, an upper limit value or a lower limit value when one or more of the effects to be avoided such as overflowing, bleeding, and aggregation of the ink were avoided in the past under the same condition as the selection information D0 and the imaging information DI can be used as the limit value D4a.

The learning processing section 412 sets a plurality of coefficients of the machine-learned model PJ through supervised machine learning using a plurality of data sets DS. Specifically, the learning processing section 412 updates the plurality of coefficients of the machine-learned model PJ so that a difference between the limit value D4a included in the data set DS and a limit value D4b output by the provisional machine-learned PJ in response to input of the selection information D0 and the imaging information DI in the data set DS is decreased. For example, the learning processing section 412 repeatedly updates the plurality of coefficients of the machine-learned model PJ by a back-propagation method so that an evaluation function indicating the difference between the limit value D4a and the limit value D4b is significantly reduced. The plurality of coefficients of the machine-learned model PJ set through the machine learning described above are stored in the storage device 420. After the machine learning described above is performed, the machine-learned model PJ outputs a statistically appropriate limit value D4 with respect to unknown selection information D0 and imaging information DI based on a potential tendency between the selection information D0 and the imaging information DI, and the limit value D4a in the plurality of data sets DS.

In the above-described learning apparatus 400, it is possible to obtain the machine-learned model PJ that performs machine learning in consideration of various effects evident in the image G used in the machine learning. For example, in the present embodiment, it is possible to obtain the machine-learned model PJ considering not only such effect as "thinning", "thickening", "breaking", or "adjoining" of the linear image, but also such effects as overflowing, bleeding, aggregation, and color saturation of the ink.

4. Modified Example

Hereinabove, the information processing apparatus, the color conversion profile creation method, the color confirmation profile creation program, and the learning apparatus according to the present disclosure have been described based on the illustrated embodiments, but the present disclosure is not limited thereto. Further, a configuration of each section according to the present disclosure can be substituted with an appropriate configuration that can implement the same functions as the above-described embodiments, and any appropriate configuration can also be added.

Figure 14:
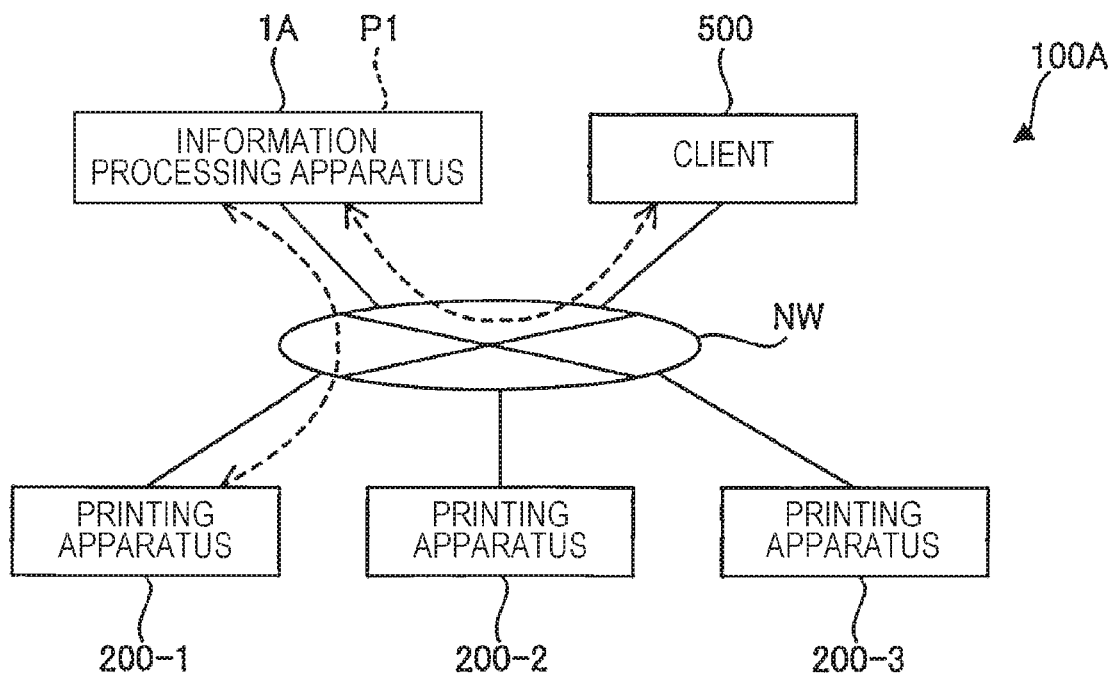
FIG. 14 is a schematic diagram illustrating an example of a configuration of a system using an information processing apparatus according to a modified example.

FIG. 14 is a schematic diagram illustrating an example of a configuration of a system 100A using an information processing apparatus 1A according to a modified example. In the above-described embodiment, a case in which the information processing apparatus 1 executes the color conversion profile creation program P1 has been described by way of an example. Here, as illustrated in FIG. 14, the information processing apparatus 1A functioning as a server may execute the color conversion profile creation program P1 and some or all of functions implemented by the execution may be provided to a client 500.

In FIG. 14, the information processing apparatus 1A is communicably connected to each of the client 500, printing apparatuses 200-1, 200-2, and 200-3 via a communication network NW including the Internet. The information processing apparatus 1A is a computer that can execute the color conversion profile creation program P1. The printing apparatuses 200-1 to 200-3 are each configured similarly to the printing apparatus 200 described above. Note that the information processing apparatus 1A may double as the learning apparatus 400 described above.

Figure 15:
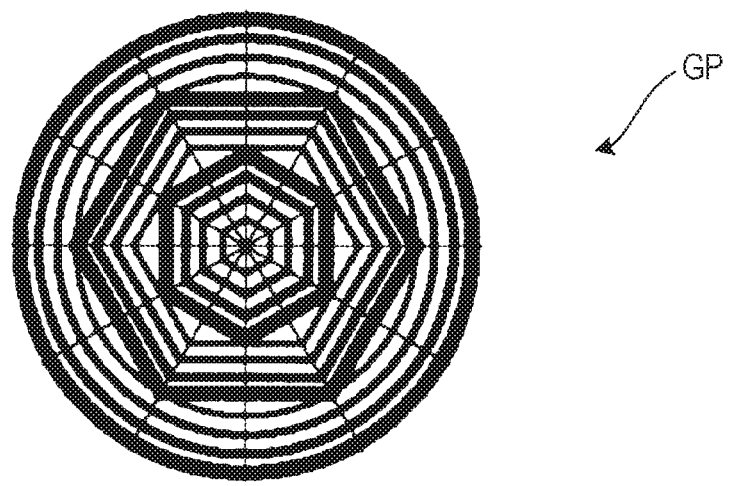
FIG. 15 is a diagram illustrating a unit image including a linear image according to a modified example.

FIG. 15 is a diagram illustrating a unit image GP including a linear image according to a modified example. A form of the image including the linear image used for creation of the color conversion profile DP or generation of the machine-learned model PJ is not limited to the above-described embodiment, and for example, may be the form as illustrated in FIG. 15. The unit image GP illustrated in FIG. 15 includes a plurality of circular linear images having different radii, and a plurality of polygonal linear images of which radii of circumscribed circles are different, and the plurality of circular linear images and the plurality of polygonal linear images are concentrically arranged.

In addition, in the above-described embodiment, a case in which ink is used as the coloring material has been described by way of an example, but the present disclosure is not limited thereto, and for example, toner may be used as the coloring material. That is, the printing section may be, for example, an electrophotographic printer. In this case, examples of the effect to be avoided can include peeling of the toner.

Further, the printing medium may be a printing medium for sublimation transfer. In this case, the imaging information used for creation of the color conversion profile or generation of the machine-learned model may be imaging information obtained by capturing an image of the printing medium, or may be imaging information obtained by capturing an image of a medium subjected to image transfer from the printing medium.

In addition, in the above-described embodiment, a case in which the additional machine learning of the machine-learned model PJ is performed in the information processing apparatus 1 has been described by way of example, but the present disclosure is not limited thereto, and the additional machine learning may be performed in the learning apparatus 400. In this case, the machine-learned model PJ that performed the additional machine learning is provided to the information processing apparatus 1 in a timely manner.

What is claimed is:

1. An information processing apparatus comprising:
a storage section configured to store a machine-learned model that learned, by machine learning, a relationship between a type of a printing medium, an amount of a coloring material on the printing medium per unit area, and an image including a linear image and printed on the printing medium;
a receiving section configured to receive input of selection information including medium-type information regarding a type of the printing medium;
an obtaining section configured to obtain imaging information obtained by capturing the image including the linear image and printed on the printing medium by a printing section that performs printing by using the coloring material;
an estimating section configured to estimate, based on the selection information and the imaging information, by using the machine-learned model, a limit value indicating a maximum value or a minimum value of an amount of the coloring material to be used for printing on the printing medium by the printing section per unit area; and
a creating section configured to create, by using the limit value, a color conversion profile including information regarding mapping between a coordinate value in a color space and an amount of the coloring material.

2. The information processing apparatus according to claim 1, wherein
the machine-learned model further learns, by machine learning, a relationship with a type of the color space, and
the selection information includes color space information regarding the type of the color space.

3. The information processing apparatus according to claim 2, wherein a value of a color difference ΔE based on the mapping in the color space is 3.0 or less.

4. The information processing apparatus according to claim 1, wherein
the machine-learned model further learns, by machine learning, a relationship with a type of the coloring material, and
the selection information includes coloring material-type information regarding the type of the coloring material.

5. The information processing apparatus according to claim 1, further comprising an additional learning section configured to receive, through a user operation, an addition of a label related to suitability of the limit value and perform additional machine learning of the machine-learned model by using the label.

6. A color conversion profile creation method comprising:
preparing a machine-learned model that learned, by machine learning, a relationship between a type of a printing medium, an amount of a coloring material on the printing medium per unit area, and an image including a linear image and printed on the printing medium;
receiving input of selection information including medium-type information regarding a type of the printing medium and obtaining imaging information obtained by capturing the image including the linear image and printed on the printing medium by a printing section that performs printing by using the coloring material;
estimating, based on the selection information and the imaging information, by using the machine-learned model, a limit value indicating a maximum value or a minimum value of an amount of the coloring material to be used for printing on the printing medium by the printing section per unit area; and
creating, by using the limit value, a color conversion profile including information regarding mapping between a coordinate value in a color space and an amount of the coloring material.

7. A learning apparatus comprising:
an input section configured to receive input of a data set in which are mapped selection information including medium-type information regarding a type of a printing medium, imaging information obtained by capturing an image including a linear image and printed on the printing medium by a printing section that performs printing by using a coloring material, and a limit value indicating a maximum value or a minimum value of an amount of the coloring material to be used for printing on the printing medium by the printing section per unit area; and
a learning processing section configured to generate, based on the data set, a machine-learned model that learned, by machine learning, a relationship between a type of the printing medium, an amount of the coloring material on the printing medium per unit area, and the image including the linear image and printed on the printing medium.

* * * * *